United States Patent Office 2,917,502
Patented Dec. 15, 1959

2,917,502

PROCESS FOR THE MANUFACTURE OF AMINO CARBOXYLIC ACID ESTERS AND PEPTIDE REACTANTS THEREFOR

Robert Schwyzer and Beat Iselin, Riehen, and Werner Rittel and Peter Sieber, Basel, Switzerland, assignors to Ciba Pharmaceutical Products, Inc., Summit, N.J.

No Drawing. Application January 23, 1957
Serial No. 635,568

Claims priority, application Switzerland
January 26, 1956

15 Claims. (Cl. 260—112)

This invention relates to a new process for the manufacture of carboxylic acid aryl esters, especially of carboxylic acid phenyl and naphthyl esters.

These carboxylic acid esters react rapidly with amines with the formation of carboxylic acid amides as described for example in Belgian Patent No. 535,525 and in South African Patent No. 303/55. In particular by reaction of aminocarboxylic acid aryl esters with aminocarboxylic acids or their esters, peptides are produced in good yield. They are also especially suitable for the manufacture of linear or cyclic polypeptides, as described for example in Belgian Patent No. 552,107, e.g. for the preparation of the antibiotic Gramicidin S.

For the manufacture of carboxylic acid aryl esters, hitherto the carboxylic acid had first to be converted into a reactive derivative, for example an acid halide or the anhydride, which was thereupon reacted with an aromatic hydroxyl compound such as phenol.

We have now found that the above specified esters can be produced directly from the corresponding acid, when a carboxylic acid is reacted with a sulfurous acid ester in which the alcohol component contains at least one aryl radical.

The carboxylic acids used as starting materials can belong to the aliphatic, aromatic, araliphatic or heterocyclic series. Especially amino-carboxylic acids are suitable. For the purpose of peptide syntheses aminocarboxylic acids are especially suitable in which the amino group is separated from the carbonyl group by 1–4 carbon atoms, as in the case of the natural amino acids. The amino group is advantageously substituted, for example by acyl radicals such as lower fatty acid, trifluoracetyl, benzoyl, p-toluenesulfonyl, carbobenzyloxy or p-nitrocarbobenzyloxy radicals, acylaminoacyl, aminoacyl-aminoacyl, alkyl, alkylene, cycloalkyl, aryl, aralkyl radicals, such as benzyl or triphenylmethyl, or heterocyclic radicals. Preferred substituents are for example those which are employed in peptide chemistry for the protection of amino groups.

As sulfurous acid esters both symmetrical and also asymmetrical esters can be used, for example such as have alcohol components containing in addition to the aryl radical any aliphatic, cycloaliphatic or araliphatic radical, e.g. an alyky or alkenyl, such as methyl, ethyl, propyl, butyl or allyl, or a halogeno-, cyano-, nitro- or tertiary amino-alkyl or -alkenyl group, or an etherified hydroxyalkyl or mercaptoalkyl, such as an alkoxyalkyl or an alkylmercaptoalkyl group, or a cycloalkyl, such as cyclopentyl, cyclohexyl or cycloheptyl radical, or an aralkyl such as benzyl radical, since in the reaction according to the present invention the carboxylic acids react in a preferential manner with the aryl radical and among these especially with such as are substituted by an electron substituent. The specified sulfurous acid esters are either known or can be prepared by direct or stepwise reaction of thionyl halides, such as thionyl chloride, with phenols or alcohols in the presence of a tertiary base, for example pyridine or triethylamine.

The aryl radical, especially the phenyl radical is either unsubstituted or substituted, especially by one or more electron attracting substituents particularly nitro or sulfonyl groups, such as alkanesulfonyl or benzenesulfonyl groups, or for example cyano groups, esterified carboxyl groups, such as carbalkoxy groups, carbamyl groups, esterified, such as alkyl-esterified, sulfo groups, sulfonyl groups or etherified hydroxyl groups, such as alkoxy groups or halogen atoms, which preferably stand in o- or p-position to the ester bond.

The reaction according to the invention is preferably conducted in the presence of a base, especially of a tertiary organic base, for example triethyl-amine or pyridine, if desired in the presence of organic solvents such as chloroform or ethyl acetate. It is advantageous to use an equimolar proportion of carboxylic acid to sulfurous acid ester. It is possible to operate under mild conditions which is of considerable importance for the synthesis of relatively complicated amino-carboxylic acid esters. The present process also gives good yields.

In resulting carboxylic acid aryl esters with amino groups protected by radicals which are easy to split off, these radicals may be split off, if desired. The triphenylmethyl radical, for example, can be removed by means of trifluoracetic acid or a solution of an inorganic acid, such as hydrochloric acid; a carbobenzyloxy radical can likewise be removed by means of trifluoracetic acid or by the action of another strong acid, such as a solution of hydrobromic acid in glacial acetic acid, or by catalytic hydrogenation; the p-toluene-sulfonyl radical can be removed by hydrolysis.

From aryl esters containing amino groups, such as amino carboxylic acid aryl esters, salts can be made in the usual manner with acids. To this end there are used preferably strong inorganic or organic acids, for example, hydrohalic acids, such as hydrochloric acid, or fatty acids such as acetic acid, or halogenated fatty acids, such as trifluoracetic acid.

Among the aryl esters that can be prepared according to the invention, the L-valyl-L-ornithyl-L-leucyl-D-phenylalanyl - L - prolyl-L-valyl-L-ornithyl-L-leucyl-D-phenylalanyl-L-proline aryl esters whose amino groups may be protected by substituents, and their salts, are new and can be used for example, as valuable intermediate products for the aforementioned preparation of the antibiotic Gramicidin S. They represent a further object of the invention.

The following examples illustrate the invention:

Example 1

A solution of 0.36 gram (0.002 mol) of hippuric acid in 1 ml. of dry pyridine is treated with 0.65 gram (0.002 mol) of bis-p-nitrophenyl sulfite and the whole allowed to stand at room temperature for 2 hours. As a result the solution becomes dark coloured and the reaction product separates out in crystalline form. The mixture is treated with 10 ml. of ice water, well ground, the crystalline material filtered off and this washed with ice water and cold alcohol. The yield of hippuric acid-p-nitrophenyl ester of M.P. 167–169° C. amounts to 0.44 gram (73%). The melting point is unchanged after recrystallisation from alcohol.

The bis-p-nitrophenyl sulfite used as starting material is known, it can be prepared with advantage by the following method:

13.9 grams (0.1 mol) of p-nitrophenol are dissolved in 50 ml. of absolute ether and treated at 0° C. with 5.95 grams (0.05 mol) of thionyl chloride. To the mixture, with shaking at 0° C., is added drop-wise in 10 minutes a solution of 10.1 grams of triethylamine (0.1 mol) in 10 ml. of ether. The separated crystalline material is filtered off after 30 minutes, washed with ice water for the removal of triethylamine hydrochloride and then washed again with a little cold alcohol and ether. Yield 11.7 grams (72%). After recrystallisation from a mixture of acetone and ether the substance melts at 98–100° C.

By using pyridine instead of triethylamine the yield amounts to 70%.

*Example 2*

209 mg. (0.001 mol) of N-carbobenzyloxy-glycine are dissolved in 0.5 ml. of pyridine and treated with 324 mg. (0.001 mol) of bis-p-nitrophenyl sulfite. The practically colourless solution is allowed to stand for 2 hours at room temperature, then diluted with ethyl acetate and while cooling with ice washed with 2 N-hydrochloric acid, saturated sodium bicarbonate solution and water, dried over magnesium sulfate and evaporated under reduced pressure. From the oily residue after the addition of a little ether 322 mg. (98%) of crystals of M.P. 120–121° C. are obtained. After recrystallisation from ethanol, the N-carbobenzyloxy-glycine p-nitrophenyl ester melts at 124–125° C. When the same reaction is made with 0.16 ml. (0.002 mol) of pyridine in chloroform or ethyl acetate (2 ml.), there are obtained after 3 hours at 50° C. 328 mg. (99%) or 325 mg. (98%), respectively, of N-carbobenzyloxy-glycine p-nitrophenyl ester. When triethylamine (0.42 ml.=0.003 mol in 2 ml. of ethyl acetate) is used as catalyst the yield is 180 mg. (55%).

*Example 3*

A solution of 1.05 grams (0.005 mol) of N-carbobenzyloxy-glycine in 2.5 ml. of dry pyridine is treated with 1.75 grams (0.006 mol) of bis-(o-carbomethoxyphenyl) sulfite of the formula

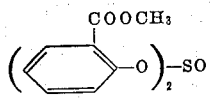

and the whole allowed to stand for 5 hours at room temperature. The solvent is then removed as far as possible under vacuum and replaced by ethyl acetate. The ethyl acetate solution is washed with cold 2 N-hydrochloric acid and water, dried and evaporated under reduced pressure. The very mobile oily residue is freed from volatile constituents at 60° C. under 0.1 mm. pressure; after the addition of a mixture of ether and petroleum ether at a low temperature 1.21 grams of crystalline material of M.P. 67–69° C. are obtained. From the mother liquor a further 0.13 gram of crystals can be isolated; total 1.34 grams (78%). After recrystallisation from a mixture of ether and petroleum ether, the N-carbobenzyloxy-glycine o-carbomethoxy-phenyl ester melts at 69–71° C.

The bis-(o-carbomethoxyphenyl) sulfite used as starting material can be prepared by the method described in Example 1 by reaction of thionyl chloride with methyl salicylate in the presence of a tertiary base. The reaction product, which is easily soluble in ether, after removal of the solvent is purified by distillation; B.P. 181–183° C. under 0.07 mm. pressure. Yield 6.23 grams (35%).

*Example 4*

209 mg. (0.001 mol) of N-carbobenzyloxy-glycine are dissolved in 0.5 ml. of pyridine and treated with 347 mg. (0.0015 mol) of ethyl-p-nitrophenyl sulfite of the formula

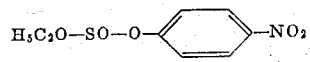

After 2 hours the reaction solution is worked up in the manner described in Example 2, whereby 220 mg. (67%) of N-carbobenzyloxy-glycine p-nitrophenyl ester of M.P. 120–121° C. are isolated.

The ethyl-p-nitrophenyl sulfite used as starting material can be prepared as follows:

A solution of 2.78 grams (0.02 mol) of p-nitrophenol in 20 ml. of absolute ether is treated at 0° C. with 2.58 grams (0.02 mol) of the ethyl ester of chlorosulfinic acid and then a solution added of 2.02 grams (0.02 mol) of triethylamine in 5 ml. of ether dropwise with shaking. After 2 hours, the triethylamine hydrochloride formed is filtered off and the filtrate concentrated under vacuum to a small volume. On addition of petroleum ether, 3.2 grams of crystals separate in the cold. After washing of the crude product with ice and a little cold alcohol 2.80 grams (61%) of ethyl-p-nitrophenyl sulfite of M.P. 31–32° C. are obtained, which after recrystallisation from a mixture of ether and petroleum ether melts at 32–33° C.

*Example 5*

A solution of 209 mg. (0.001 mol) of N-carbobenzyloxy-glycine in 0.5 ml. of dry pyridine is treated with 279 mg. (0.001 mol) of phenyl-p-nitrophenyl sulfite, the whole left to stand for 5 hours at room temperature and thereupon worked up by the method described in Example 2. By this means 286 mg. (87%) of N-carbobenzyloxy-glycine p-nitrophenyl ester of M.P. 120–121° C. are obtained.

The phenyl-p-nitrophenyl sulfite used as starting material can be prepared by the method described in Example 4 by reaction of the phenyl ester of chlorosulfinic acid with p-nitrophenol. After recrystallisation from a mixture of ether and petroleum ether it melts at 41–43° C. Yield 68%.

*Example 6*

0.59 gram (0.005 mol) of succinic acid is dissolved in 3 ml. of dry pyridine and mixed with 3.34 grams (0.01 mol) of di-1-naphthyl sulfite. After 1 hour the sulfite compound is dissolved completely, and after 18 hours the reaction solution is concentrated under reduced pressure. On addition of ethyl acetate to the oily residue 1.20 grams (65%) of crystals of melting point 152–154° C. separate. After recrystallization from benzene the resulting succinic acid di-1-naphthyl ester melts at 153–155° C.

*Example 7*

A solution of 0.68 gram (0.005 mol) of phenylacetic acid and 1.67 grams (0.005 mol) of di-2-naphthyl sulfite in 2.5 ml. of pyridine is allowed to stand for 18 hours at room temperature. The solvent is then removed under reduced pressure and the product worked up in the manner described in Example 2, 0.24 gram (35%) of phenylacetic acid being recovered from the alkaline extracts acidification, whereas the neutral portion on crystallization from petroleum ether yields 0.65 gram (50%) of phenylacetic acid 2-naphthyl ester which after repeated recrystallization from petroleum ether melts at 85–86° C.

The dinaphthyl sulfites used as starting material in Examples 6 and 7 are known. They are prepared advantageously by the method described in Example 1.

*Example 8*

1.77 grams (0.005 mol) of bis-(2,6-dimethoxyphenyl) sulfite are suspended in a solution of 0.92 gram (0.0075 mol) of benzoic acid in 3 ml. of pyridine. When the reaction mixture is allowed to stand at room temperature the sulfurous acid ester gradually passes into solution; after 40 hours the reaction solution is worked up in the manner described in Example 2. After recrystallization twice from alcohol, the crystalline crude product yields 0.63 gram (49%, calculated on the sulfite) of benzoic acid 2,6-dimethoxyphenyl ester of melting point 114–116° C.

The bis-(2,6-dimethoxyphenyl) sulfite used as starting material can be prepared by the method described in Example 1 by reacting thionyl chloride with 2,6-dimethoxyphenol in the presence of a tertiary base. After recrystallization from alcohol, the bis-(2,6-dimethoxyphenyl) sulfite melts at 97–99° C.; the yield is 85%.

Example 9

A solution of 1.05 grams (0.005 mol) of p-bromobenzoic acid and 1.17 grams (0.005 mol) of diphenyl sulfite in 3 ml. of pyridine is allowed to stand at room temperature. After 30 minutes already the reaction product begins to separate in crystalline form. After 20 hours the crystals (0.26 gram; melting point 115–117° C.) are filtered off and the mother liquor worked up in the usual manner, a further 0.68 gram of ester (total of 0.94 gram; 68%) being obtained. After recrystallization from a mixture of ether and petroleum ether, the p-bromobenzoic acid phenyl ester melts at 116–117° C.

Example 10

In a manner analogous to that described in Example 9, a solution of 0.69 gram (0.005 mol) of salicylic acid in 3 ml. of pyridine is reacted with 1.62 grams (0.005 mol) of bis-p-nitrophenyl sulfite. 0.46 gram of the expected ester crystallizes directly from the reaction solution, and after working up a further 0.32 gram (total of 0.78 gram; 60%) is obtained. The salicylic acid p-nitrophenyl ester, after recrystallization from alcohol melts at 148–150° C.

Example 11

0.62 gram (0.005 mol) of nicotinic acid is suspended in 3 ml. of pyridine and admixed with 1.17 grams (0.005 mol) of diphenyl sulfite. On standing at room temperature, the acid gradually passes into solution. After 20 hours the solvent is evaporated in vacuo, the residue taken up in ethyl acetate and the ethyl acetate solution washed with saturated sodium bicarbonate solution and water. An excess of hydrogen chloride gas is introduced into the dried solution, the crystalline hydrochloride of nicotinic acid phenyl ester filtered off and washed with alcohol; the yield is 0.85 gram (72%). After recrystallization from alcohol the substance melts at 173–175° C.

When an aqueous solution of the hydrochloride is rendered alkaline with sodium carbonate solution, the free nicotinic acid phenyl ester crystalline instantly in quantitative yield; after recrystallization from petroleum ether it melts at 69–71° C.

Example 12

410 mg. (0.002 mol) of N-phthalyl-glycine are suspended in 1 ml. of pyridine and mixed with 468 mg. (0.002 mol) of diphenyl sulfite. After 3 hours all starting material has dissolved. After 5 hours the reaction solution is worked up in the manner described in Example 2. From the alkaline extracts there are recovered on acidification 88 mg. (21%) of N-phthalyl-glycine, whereas the neutral portion on addition of a small amount of ether yields 395 mg. (70%) of N-phthalyl-glycine phenyl ester of melting point 119–121° C. The melting point is not changed by recrystallization from a mixture of acetone and ether.

Under the same reaction conditions, the corresponding reaction of 418 mg. (0.002 mol) of N-carbobenzyloxy-glycine with diphenyl sulfite gives the known N-carbobenzyloxy-glycine phenyl ester of melting point 68–70° C. in a yield of 401 mg. (70%).

Example 13

500 mg. of N-carbobenzyloxy-glycine and 900 mg. of bis-(p-dimethylaminophenyl) sulfite in 3 ml. of absolute pyridine are heated at 50° C. for 24 hours. The mixture is then poured into water and the resulting precipitate filtered off with suction. There are obtained in this manner 610 mg. of N-carbobenzyloxy-glycine p-dimethylaminophenyl ester; the yield is 78%. For purification, the substance is recrystallized twice from a mixture of ethanol and water. It forms colorless needles of melting point 109° C.

The sulfite used for the above reaction can be prepared in this manner:

With stirring and cooling with ice, 1.33 ml. of thionyl chloride in 20 ml. of absolute ether are added dropwise in the course of 1½ hours to 5 grams of p-dimethylaminophenol and 7.5 ml. of triethylamine in 50 ml. of absolute ether. Stirring is continued at room temperature for 1 hour, the resulting precipitate filtered off with suction, and washed very well with ether. The ether filtrate is extracted with water, the solvent dried and evaporated. The residue is recrystallized from methanol. There are obtained 4.02 grams of bis-(p-dimethylamino-phenyl) sulfite of melting point 57° C. The yield is 69%. For purification the substance can be recrystallized from ethanol and a mixture of ether and petroleum ether, after it melts at 58° C.

Example 14

500 mg. of N-carbobenzyloxy-glycine and 1.2 grams of bis-(p-methanesulfonyl-phenyl) sulfite in 3 ml. of absolute pyridine are allowed to stand at room temperature for 2½ hours. The mixture is then introduced with stirring into 100 ml. of 1 N-hydrochloric acid and the resulting precipitate filtered off with suction. There are obtained 840 mg. of N-carbobenzyloxy-glycine p-methanesulfonyl-phenyl ester of melting point 127–130° C.; the yield is 97%. After two recrystallizations from ethanol the substance is analytically pure. It forms colorless leaflets of melting point 1330 C.

The bis-(p-methanesulfonyl-phenyl) sulfite used as starting material is obtained by adding dropwise 4.8 ml. of triethylamine in 15 ml. of tetrahydrofurane to 5 grams of p-methanesulfonyl-phenol and 1.06 ml. of thionyl chloride in 25 ml. of tetrahydrofurane while stirring and cooling with ice. After 1 hour the resulting precipitate is filtered off with suction and slurried with water, the sulfite remaining behind as an insoluble substance. There are obtained 2.87 grams of sulfite of melting point 146–149° C.; the yield is 51%.

Example 15

500 mg. of N-carbobenzyloxy-glycine and 1 gram of bis-p-cyanophenyl sulfite in 3 ml. of absolute pyridine are allowed to stand at room temperature for 2½ hours. The solution is then diluted with ether and extracted with ice-cold 1 N-hydrochloric acid and ice-cold 1 N-caustic soda solution. After drying, the ether is evaporated and the residue recrystallized from carbon tetrachloride. There are obtained 600 mg. of N-carbobenzyloxy-glycine p-cyanophenyl ester of melting point 93° C.; these are 81% of the theoretical yield. For purification the substance can be recrystallized again from carbon tetrachloride, the melting point rising to 94° C. The substance crystallizes in the form of white needles.

The bis-p-cyanophenyl sulfite used as starting material is prepared by adding dropwise 7 ml. of triethylamine in 20 ml. of ether to 5 grams of p-hydroxybenzonitrile and 1.53 ml. of thionyl chloride in 30 ml. of ether while stirring and cooling with ice. Stirring of the mixture is continued at room temperature for 2 hours, and the resulting precipitate filtered off with suction, slurried in ice-cold water and the insoluble sulfite filtered off with suction. The yield is 4.78 grams (80%). The bis-p-cyanophenyl sulfite readily decomposes. Even at room temperature some sulfur dioxide is constantly split off.

Example 16

500 mg. of N-carbobenzyloxy-glycine and 1 gram of bis-(p-carbomethoxyphenyl) sulfite in 3 ml. of absolute pyridine are allowed to stand at room temperature for 5 hours. The mixture is poured into 1 N-hydrochloric acid, the precipitate filtered off with suction and recrystallized from carbon tetrachloride. There are obtained 565 mg. of N-carbobenzyloxy-glycine p-carbomethoxyphenyl ester; the yield is 69%. For purification the substance is recrystallized from methanol. Its melting point is then at 121° C.

The bis-(p-carbomethoxyphenyl) sulfite used as starting material can be prepared as follows:

5.5 ml. of triethylamine in 10 ml. of ether are added dropwise to 5 grams of p-hydroxybenzoic acid methyl ester and 1.2 ml. of thionyl chloride in 25 ml. of ether and 5 ml. of tetrahydrofurane. After 2 hours the reaction mass is filtered with suction, the filtrate evaporated, the resulting residue dissolved in carbon tetrachloride some insoluble oil filtered off and the carbon tetrachloride evaporated completely. There are obtained 3.99 grams of bis-(p-carbomethoxyphenyl) sulfite in the form of an oil which slowly crystallizes. The yield is 69%. The product can be used without further purification.

Example 17

500 mg. of hippuric acid and 1.1 grams of bis-(p-dimethylamino-phenyl) sulfite in 3 ml. of absolute pyridine are heated at 50° C. for 24 hours. The mixture is poured into 200 ml. of water, the precipitated substance dissolved in ethyl acetate and the resulting solution extracted with 1 N-caustic soda solution and water. The ethyl acetate is evaporated to dryness, the residue dissolved in benzene and chromatographed over a column of alumina. With benzene, 250 mg. of hippuric acid p-dimethylamino-phenyl ester can be eluated which, after evaporation of the benzene remain behind in the form of crystals melting at 131–132° C. The yield is 30%.

The preparation of the bis-(p-dimethylamino-phenyl) sulfite used as starting material is described in Example 13.

Example 18

29 grams of N-carbobenzyloxy-L-leucine and 53 grams of bis-p-nitrophenyl sulfite in 150 ml. of pyridine are allowed to stand at room temperature for 3 days. The pyridine is evaporated under reduced pressure, the residue dissolved in ether and extracted with ice-cold 1 N-caustic soda solution and 1 N-hydrochloric acid. After drying the solvent is distilled off and the residue recrystallized from a mixture of ether and petroleum ether. There are obtained 31.7 grams of N-carbobenzyloxy-L-leucine p-nitrophenyl ester of melting point 92° C. The yield is 75%. After another recrystallization from a mixture of ether and petroleum ether the melting point is at 93° C.

Example 19

A solution of 634 mg. (0.002 mol) of N-(triphenyl-methyl)-glycine and 668 mg. (0.002 mol) of di-1-naphthyl sulfite in 1 ml. of pyridine is allowed to stand at room temperature for 18 hours and then worked up in the manner described in Example 2. There are obtained 578 mg. (65%) of N-(triphenyl-methyl)-glycine 1-naphthyl ester which after recrystallization from a mixture of ether and petroleum ether melts at 127–128° C.

Under the same reaction conditions, the reaction of N-carbobenzyloxy-glycine and di-1-naphthyl sulfite gives the N-carbobenzyloxy-glycine 1-naphthyl ester in a yield of 85%. After recrystallization from ether the substance melts at 87–89° C.

Example 20

Under the reaction conditions mentioned in Example 19, the reaction of 418 mg. (0.002 mol) of N-carbobenzyloxy-glycine and 668 mg. (0.002 mol) of di-2-naphthyl sulfite yields 606 mg. (90%) of N-carbobenzyloxy-glycine 2-naphthyl ester. After recrystallization from ether the substance melts at 109–110° C.

Example 21

4.00 grams of bis-p-nitrophenyl sulfite (0.0125 mol) are added to a solution of 6.00 grams of N-carbobenzyloxy-L-valine (0.012 mol) in 12 ml. of dry pyridine, and the clear solution allowed to stand at 30° C. for 16 hours. The pyridine is then removed by vacuum-distillation and the residue worked up as described in Example 2.

By recrystallization of the neutral residue from a mixture of ether and petroleum ether there are obtained 7.92 grams of N-carbobenzyloxy-L-valine p-nitrophenyl ester in the form of fine needles of melting point 56–57° C. The yield is 89%.

Example 22

16.2 grams of bis-p-nitrophenyl sulfite (0.050 mol) are added to a solution of 10.0 grams of (N-carbobenzyloxy-glycyl)-glycine (0.042 mol) in 30 ml. of dry pyridine. Dissolution occurs instantly. After a short while crystals begin to separate. The reaction mass is allowed to stand at room temperature for 3 hours and the precipitate then filtered off with suction. After washing with a small amount of ethyl acetate and ether there are obtained 1.28 grams of crystals of melting point 162–163° C. The filtrate is concentrated in vacuo to a small volume and then worked up in the manner described in Example 2. The neutral residue weighs 9.9 grams; after crystallization from acetone there are obtained 9.00 grams of crystals of melting point 163–165° C. The total yield of crystalline (N-carbobenzyloxy-glycyl)-glycine p-nitrophenyl ester thus is 10.28 grams (76%).

Example 23

1.25 grams of (N-carbobenzyloxy-L-leucyl)-D-phenyl-alanine and 1.5 grams of bis-p-nitrophenyl sulfite in 5 ml. of pyridine are allowed to stand at room temperature for 18 hours. The mixture is dissolved in ethyl acetate and ether and extracted with ice-cold 1 N-caustic soda solution and 1 N-hydrochloric acid. The solution is dried, the solvents distilled off, and the residue recrystallized from methanol. 535 mg. of (N-carbobenzyloxy-L-leucyl)-D-phenyl-alanine p-nitrophenyl ester are obtained which amount to a yield of 33%. After another recrystallization from methanol, the substance is obtained in white needles of melting point 165–166° C.

Example 24

10.35 grams (0.03 mol) of N-carbobenzyloxy-S-benzyl-cysteine are dissolved in 15 ml. of dry pyridine and mixed with 9.72 grams (0.03 mol) of bis-p-nitrophenyl sulfite. The reaction solution is allow to stand at room temperature for 2 hours, then concentrated in vacuo and after the addition of ethyl acetate worked up in the manner described in Example 2. The product obtained in the form of an oil, after addition of ether, yields 11.12 grams (80%) of crystalline N-carbobenzyloxy-S-benzyl-L-cysteine p-nitrophenyl ester of the formula

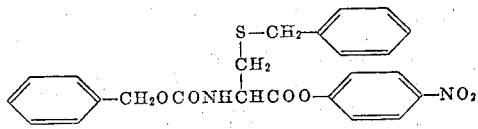

which after recrystallization from ethanol melts at 89–91° C. $[\alpha]_D^{24} = -9° \pm 1°$ (c.=3.92 in chloroform).

Example 25

540 mg. of trityl-L-valyl-Nδ-tosyl-L-ornithyl-L-leucyl-D - phenylalanyl - L - prolyl - L - valyl - Nδ - tosyl - L-ornithyl-L-leucyl-D-phenylalanyl-L-proline and 500 mg. of bis-p-nitrophenyl sulfite are dissolved in 5 ml. of pyridine and kept for 5 hours at room temperature. The pyridine is then evaporated under vacuum and the residue taken up in ethyl acetate and washed with tartaric acid solution and water. After evaporation of the ethyl acetate, excess of nitrophenyl is removed with a mixture of ether-petroleum ether (1:1). After this treatment, the colorless, solid residue no longer becomes yellow on introduction into dilute ammonia (neither free nitrophenol nor bis-p-nitrophenyl sulfite is present). The purity of the resulting p-nitrophenyl ester of trityl-L- valyl - Nδ - tosyl - L - ornithyl - L - leucyl - D - phenylalanyl - L - prolyl - L - valyl - Nδ - tosyl - L - ornithyl-L-leucyl-D-phenylalanyl-L-proline was spectroscopically determined by means of a solution of 0.5 N-aqueous-alcoholic caustic soda solution (1:1; v;v) and found to be 92%.

For splitting off the trityl radical, 500 mg. of the nitrophenyl ester are dissolved in 10 ml. of trifluoracetic acid and the solution, with cooling to −5° C., treated with 2 ml. of water in small portions. The solution is kept for 15 minutes at room temperature, as a result of which much triphenylcarbinol separates. The solvent is then evaporated under $10^{-2}$ mm. pressure using a receiver cooled to −80° C. (bath temperature 30° C.). The residue is thoroughly washed with ether and then dried under a pressure of $10^{-3}$ mm. It constitutes the trifluoracetic acid salt of p-nitrophenyl ester of L-valyl-Nδ-tosyl - L - ornithyl - L -leucyl - D - phenylalanyl - L-prolyl - L - valyl - Nδ - tosyl - L - ornithyl - L - leucyl-D-phenylalanyl-L-proline.

From this substance the antibiotic Gramicidin S can be prepared as follows:

390 mg. of the trifluoracetic acid salt of L-valyl-Nδ-tosyl - L - ornithyl - L - leucyl-D-phenylalanyl-L-prolyl-L-valyl - Nδ-tosyl-L-ornithyl-L-leucyl-D-phenylalanyl-L-proline p-nitrophenyl ester are dissolved in 10 ml. of dimethyl-formamide together with 3 drops of glacial acetic acid, the solution introduced dropwise during 3 hours with stirring into 75 ml. of pyridine (at 95° C.) and the resulting faintly brownish solution maintained for a further hour at the said temperature. The solvent in evaporated under vacuum and the residue dried under high vacuum over concentrated sulfuric acid. The reaction product is extracted with boiling ether. The insoluble residue is dissolved in a mixture of isopropanol-methanol-water (1:1:1) and filtered through two columns of ion exchanger "Merck I" and "Merck III" (swelled with the same solvent). The liquid which runs through is treated at 45° C. with water and freed under vacuum from organic solvents. The powdery reaction product is filtered with suction and dried under high vacuum over caustic soda. 170 mg. are obtained of a practically colorless, ninhydrin-negative substance.

For further purification, the "neutral fractions" in benzene-chloroform (9:1) are adsorbed in a volume of 12 grams of aluminum oxide (Brockmann) and washed with the same solvent mixture. Elution is carried out with chloroform and ethyl acetate. The operation is repeated with 3 grams of aluminum oxide. The residue of the chloroform and ethyl acetate fractions is dried, whereupon it becomes relatively difficultly soluble in ethyl acetate. From 65% ethanol, 91.1 mg. are obtained of a colorless compound crystallizing in long rods. The melting point after recrystallization several times from 65% ethanol is 319–320° C. with decomposition (brown coloration above 305° C., sintering at 316° C.). This product is cyclo - L - valyl-N-tosyl-L-ornithyl-L-leucyl-D-phenylalanyl-L-prolyl-L-valyl-N-tosyl-L-ornithyl-L-leucyl-D-phenyl-alanyl-L-proline in the form of its dihydrate. It is further characterized by its infra-red absorption spectrum which has bands at 3.08; 3.28; 6.53; 6.68; 7.54; 7.76; 7.97; 8.10; 8.43; 8.69; 9.17; 12.26 and 14.25μ.

60 mg. of this dihydrate are dissolved in 20 ml. of liquid ammonia and treated with 100 mg. of sodium in small pieces. After complete dissolution of the sodium the solution remains clear. After the addition of a little ammonium chloride, the ammonia is evaporated and the residue freed under high vacuum from mercaptan produced. The reaction product is taken up with absolute ethanol to which a few drops of a solution of hydrochloric acid in ethyl acetate are added. After filtration, the solvent is evaporated. The residue is dissolved in a few drops of 65% ethanol and treated with water at 50° C. until a distinct turbidity is produced. Thereupon the dihydrochloride of the antibiotic Gramicidin S crystallizes in the form of fine needles. The melting point is 268–270° C. with decomposition, the melting point tube being introduced into a medium already at 250° C. A test for chlorine ions after boiling with 2 N-nitric acid is positive, $[\alpha]_D = -295°$ (70% ethanol).

Gramicidin S is cyclo-L-valyl-L-ornithyl-L-leucyl-D-phenylalanyl - L - prolyl - L - valyl-L-ornithyl-L-leucyl-D-phenylalanyl-L-proline.

The trityl-L-valyl-Nδ-tosyl-L-ornithyl-L-leucyl-D-phenylalanyl-L-prolyl-L-valyl-Nδ-tosyl-L-ornithyl-L-leucyl - D-phenylalanyl-L-proline used as starting material can be obtained as follows:

100 mg. of L-valyl-Nδ-tosyl-L-ornithyl-L-leucyl-D-phenylalanyl-L-proline methylester hydrochloride are dissolved in 1.5 ml. of chloroform, treated with 100 mg. of triphenyl-chloromethane and 5 drops of triethylamine and the whole maintained for 10 hours at room temperature. The solvent is then removed under vacuum and the residue freed from excess of chloride and carbinol by grinding with a mixture of petroleum ether and ether (1:1). The solid residue is dissolved in ethyl acetate and washed with tartaric acid solution and water. The dried solution, after evaporation, leaves 122 mg. (98%) of an almost colorless, glassy residue. By reprecipitation from benzene by means of petroleum ether, the trityl-L-valyl-Nδ-tosyl-L-ornithyl-L-leucyl-D - phenylalanyl - L - proline methylester is obtained as a solid, microcrystalline compound of melting point 123.5–125.5° C. In trifluoracetic acid, the characteristic yellow color for trityl compounds is produced. For analysis, the compound is dried for 2 hours at 90° C. under $10^{-3}$ mm. of mercury. $C_{57}H_{70}O_8NS$ (999.3).—Calculated: N, 8.41; S, 3.21. Found: N, 8.35; S, 2.96%.

This compound has the formula

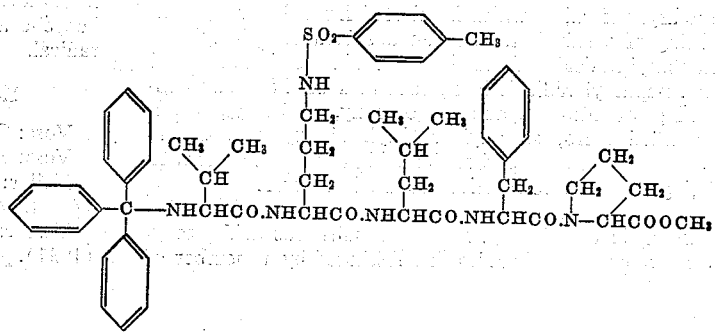

200 mg. of the above methyl ester are dissolved in 7.5 ml. of dioxane and freed from a slight turbidity by filtration through Celite (diatomaceous earth). After addition of a mixture of 1.5 ml. of N-caustic soda solution, 1.5 ml. of water and 0.5 ml. of methanol, the clear solution is heated to 37° C. for hydrolysis. From time to time, 3 drops of this solution are diluted with water After 45 minutes no further turbidity takes place. The batch is poured into 200 ml. of water at 5° C. and acidified with about 2 ml. of acetic acid (2 N). After 1 hour at 5° C., the free acid is filtered with suction, washed with water and dried: 110 mg. (56%). Extraction of the mother liquor with ethyl acetate followed by customary working up gives a further 70 mg. (35%). Hydrolysis of a test portion with trifluoracetic acid and chromatography on Whatman No. 1 paper with n-butanol-glacial acetic acid-water (4:1:1) gives a spot, ninhydrin-positive with $R_f=0.90$. Zeisel determinations give at the most traces of methoxyl. 580 mg. of the resulting free acid are dissolved together with 475 mg. of L-valyl-Nδ-tosyl-L-ornithyl-L-leucyl-D-phenylalanyl-L-proline methyl ester and 155 mg. of cyclohexyl-(morpholinyl-ethyl)-carbodiimide in ethyl acetate and the solution maintained for 5 hours at room temperature. The batch is then diluted with ethyl acetate and washed at 0° C. with N-hydrochloric acid, dilute ammonia, water and saturated common salt solution. The dried solution leaves on evaporation and drying under high vacuum 1.04 grams (100%) of a colorless glass which slowly crystallizes. Reprecipitation from benzene-petroleum ether and drying at 80° C. under 0.001 mm. pressure gives trityl-L-valyl-Nδ-tosyl-L-ornithyl-L-leucyl-D-phenylalanyl-L-prolyl-L-valyl-Nδ-tosyl-L-ornithyl-L-leucyl-D-phenylalanyl-L-proline methyl ester of melting point 106–107° C.

For hydrolysis, 1 gram of this methyl ester in 30 ml. of dioxane is treated with 11 ml. of 0.5 N-caustic soda solution and 5 ml. of methanol in the manner described above for the hydrolysis of the trityl-pentapeptide methyl ester and worked up. The hydrolysis is practically complete after ½ hour. By precipitation of the solution diluted with 900 ml. of cold water, with about 10 ml. of 2 N-acetic acid, 600 mg. of colorless, solid substance are obtained. The resulting free acid melts at 133–134° C. and contains only residual traces of methoxyl groups.

What is claimed is:

1. A process for the manufacture of carboxylic acid aryl esters, wherein an amino carboxylic acid is reacted in the presence of a tertiary organic nitrogen base with a sulfurous acid aryl ester, the aryl radical of which is selected from the group consisting of a substituted and an unsubstituted phenyl and naphthyl radical, the substituent in said substituted phenyl and naphthyl radicals being members of the group consisting of nitro, cyano, carbalkoxy, carbamyl, alkyl-esterified sulfo, sulfonyl, sulfinyl, alkoxy groups and halogen atoms, the carboxylic acid group to be esterified being the sole free reactive group of said acid.

2. A process for the manufacture of carboxylic acid aryl esters, wherein an amino carboxylic acid is reacted in the presence of pyridine with a sulfurous acid aryl ester, the aryl radical of which is selected from the group consisting of a substituted and an unsubstituted phenyl and naphthyl radical, the substituent in said substituted phenyl and naphthyl radicals being members of the group consisting of nitro, cyano, carbalkoxy, carbamyl, alkyl-esterified sulfo, sulfonyl, sulfinyl, alkoxy groups and halogen atoms, the carboxylic acid group to be esterified being the sole free reactive group of said acid.

3. A process according to claim 1, wherein amino carboxylic acid is reacted with a sulfurous acid phenyl ester whose phenyl radical is substituted by a member of the group consisting of nitro, cyano, carbalkoxy, carbamyl, alkyl-esterified sulfo, sulfonyl, sulfinyl and alkoxy groups and halogen atoms.

4. A process according to claim 1, wherein an aminocarboxylic acid whose amino group is protected by at least one substituent, is reacted with a sulfurous acid phenyl ester whose phenyl radical is substituted by a member of the group consisting of nitro, cyano, carbalkoxy, carbamyl, alkyl-esterified sulfo, sulfonyl, sulfinyl and alkoxy groups and halogen atoms.

5. A process according to claim 1, wherein an aminocarboxylic acid whose amino group is protected by at least one substituent is reacted with a sulfurous acid ester containing at least one phenyl radical substituted in p-position by a sulfonyl group.

6. A process as set forth in claim 4, wherein trityl - L - valyl - Nδ - tosyl - L - ornithyl - L - leucyl - D - phenylalanyl - L - prolyl - L - valyl - Nδ - tosyl - L - ornithyl - L - leucyl - D - phenylalanyl - L - proline is used as aminocarboxylic acid.

7. Salts of the L - valyl - Nδ - tosyl - ornithyl - L - leucyl - D - phenylalanyl - L - prolyl - L - valyl - Nδ - tosyl - L - ornithyl - L - leucyl - D - phenylalanyl - L - proline p-nitrophenyl ester.

8. A process according to claim 1 wherein an amino carboxylic acid is reacted with a symmetrical sulfurous acid carbocyclic aryl ester.

9. A process according to claim 1, wherein an amino carboxylic acid is reacted with an asymmetrical sulfurous acid carbocyclic aryl ester.

10. A process according to claim 1, wherein an amino carboxylic acid is reacted with a sulfurous acid carbocyclic aryl ester containing at least one phenyl radical.

11. A process according to claim 1, wherein an aminocarboxylic acid whose amino group is protected by at least one substituent is reacted with a sulfurous acid carbocyclic aryl ester.

12. A process according to claim 1, wherein an aminocarboxylic acid whose amino group is protected by at least one substituent is reacted with a sulfurous acid carbocyclic aryl ester.

13. A process according to claim 3, wherein an aminocarboxylic acid whose amino group is protected by at least one substituent, is reacted with a sulfurous acid carbocyclic aryl ester.

14. A process according to claim 1, wherein an aminocarboxylic acid whose amino group is protected by at least one substituent, is reacted with a sulfurous acid carbocyclic aryl ester containing at least one phenyl radical.

15. A process according to claim 1, wherein an aminocarboxylic acid whose amino group is protected by at least one substituent, is reacted with a sulfurous acid carbocyclic aryl ester containing at least one p-nitrophenyl radical.

References Cited in the file of this patent

Voss: Chem. Abstracts, vol. 25, p. 69 (1931).
Voss: Ber. Deut. Chemie, vol. 70, pp. 388–392 (1937).
Noller: Chem. of Org. Compounds, p. 302 (1957), W. B. Saunders Co., Philadelphia.
Voss et al.: Liebig's Analen der Chemie, Bande 485 (1931), p. 269.

UNITED STATES PATENT OFFICE

CERTIFICATE OF CORRECTION

Patent No. 2,917,502            December 15, 1959

Robert Schwyzer et al.

It is hereby certified that error appears in the printed specification of the above numbered patent requiring correction and that the said Letters Patent should read as corrected below.

Column 2, line 16, for "presencse" read -- presence --; column 5, line 44, for "crystalline" read -- crystallizes --; column 6, line 30, for "1330 C." read -- 133° C. --; column 7, line 11, after "tetrachloride" insert a comma.

Signed and sealed this 20th day of September 1960.

(SEAL)
Attest:

KARL H. AXLINE
Attesting Officer

ROBERT C. WATSON
Commissioner of Patents